United States Patent [19]
Deloy

[11] Patent Number: 5,923,551
[45] Date of Patent: Jul. 13, 1999

[54] COMBINED BOOST/FLYBACK POWER CONVERTOR

[75] Inventor: Jeff J. Deloy, Central City, Iowa

[73] Assignee: Rockwell International Corporation, Costa Mesa, Calif.

[21] Appl. No.: 08/994,112

[22] Filed: Dec. 19, 1997

[51] Int. Cl.$^6$ ................................. H02M 1/10; H02J 1/00
[52] U.S. Cl. ............................. 363/142; 307/75; 307/80; 307/87
[58] Field of Search ........................... 363/142; 323/222; 307/72, 74, 75, 80, 85, 86, 87

[56] References Cited

U.S. PATENT DOCUMENTS

| | | | |
|---|---|---|---|
| 3,873,846 | 3/1975 | Morio et al. | 307/66 |
| 4,185,315 | 1/1980 | Miller | 307/72 |
| 4,366,389 | 12/1982 | Hussey | 307/66 |

*Primary Examiner*—Shawn Riley
*Assistant Examiner*—Bao Q. Vu
*Attorney, Agent, or Firm*—Kyle Eppele; James P. O'Shaugnessy

[57] ABSTRACT

An avionics power conversion circuit having a first input adapted to receive an AC input signal, a second input adapted to receive a DC input signal and an output at which converted signals are provided. Power conversion circuitry, coupled to each of the first and second inputs and to the output, provides boost conversion of the AC input signal when the AC input signal is applied to the first input and provides flyback conversion of the DC input signal when the DC input signal is applied to the second input. The power conversion circuitry provides the boost conversion and the flyback conversion using a single transformer coupled between the first and second inputs and the output.

18 Claims, 2 Drawing Sheets

COMBINED BOOST/FLYBACK POWER CONVERTOR

FIELD OF THE INVENTION

The present invention relates to aviation electronics (avionics). More particularly, the present invention relates to an avionics power conversion circuit which is adapted to convert power from either of an AC voltage source or a DC voltage source, as provided by an aircraft power system, into a higher DC voltage using a single transformer.

BACKGROUND OF THE INVENTION

Aircraft power systems in various types of aircraft frequently provide differing types of supply voltages. Occasionally, power supplies on the aircraft may be required to convert power from these different types of supply voltages into a higher voltage DC source. For example, a single avionics power supply may be required to draw power from an AC source or a DC source as provided by an aircraft power system. More specifically, the AC power source may require the load (avionics power supply) to be corrected for power factor and current harmonics, or that the rectified equivalent of the AC supply be stepped up to a higher voltage to provide extended playthru of power interrupts. In this given scenario, a preconvertor is typically required at the AC input to the power supply. Power drawn from a DC source, typically 12 to 40V, may be required to be stepped up by a preconvertor to some higher voltage to provide playthru for DC power interrupts. In either case, an additional convertor is required to condition the incoming power supply to that which is usable by a specific load. The burden becomes truly great when the same power supply is required to draw its power from both AC and DC type sources in this fashion.

The need for separate convertors necessary in the prior art for preconverting or conditioning AC and DC inputs requires significantly more space in the avionics than is desired. In avionics systems, available space is typically at a minimum. Additionally, the separate convertors necessary for preconverting or conditioning the AC and DC inputs requires additional components which increases costs. Specifically, each of the two conversion circuits or stages typically requires its own transformer, which affects cost and space adversely.

SUMMARY OF THE INVENTION

An avionics power conversion circuit having a first input adapted to receive an AC input signal, a second input adapted to receive a DC input signal and an output at which converted signals are provided. Power conversion circuitry, coupled to each of the first and second inputs and to the output, provides boost conversion of the AC input signal when the AC input signal is applied to the first input and provides flyback conversion of the DC input signal when the DC input signal is applied to the second input. The power conversion circuitry provides the boost conversion and the flyback conversion using a single transformer coupled between the first and second inputs and the output.

DETAILED DESCRIPTION OF THE PREFERRED EMBODIMENTS

The present invention is based in part upon the recognition that significant volume in an avionics power supply can be saved by combining the convertors necessary for preconverting or conditioning the AC and DC inputs. Typically, a "boost convertor" is implemented to provide power factor/harmonic correction of AC inputs while creating an output voltage higher than the peak value of the AC source. Also, a "flyback (both continuous and/or discontinuous mode) convertor" may be implemented to boost a DC source to some higher more usable DC value. In accordance with the present invention, these two convertor types may be combined in such a way that a single transformer or power convertor stage can provide the "preconvertor" function for both AC and DC type inputs to the power supply.

Figure 1:
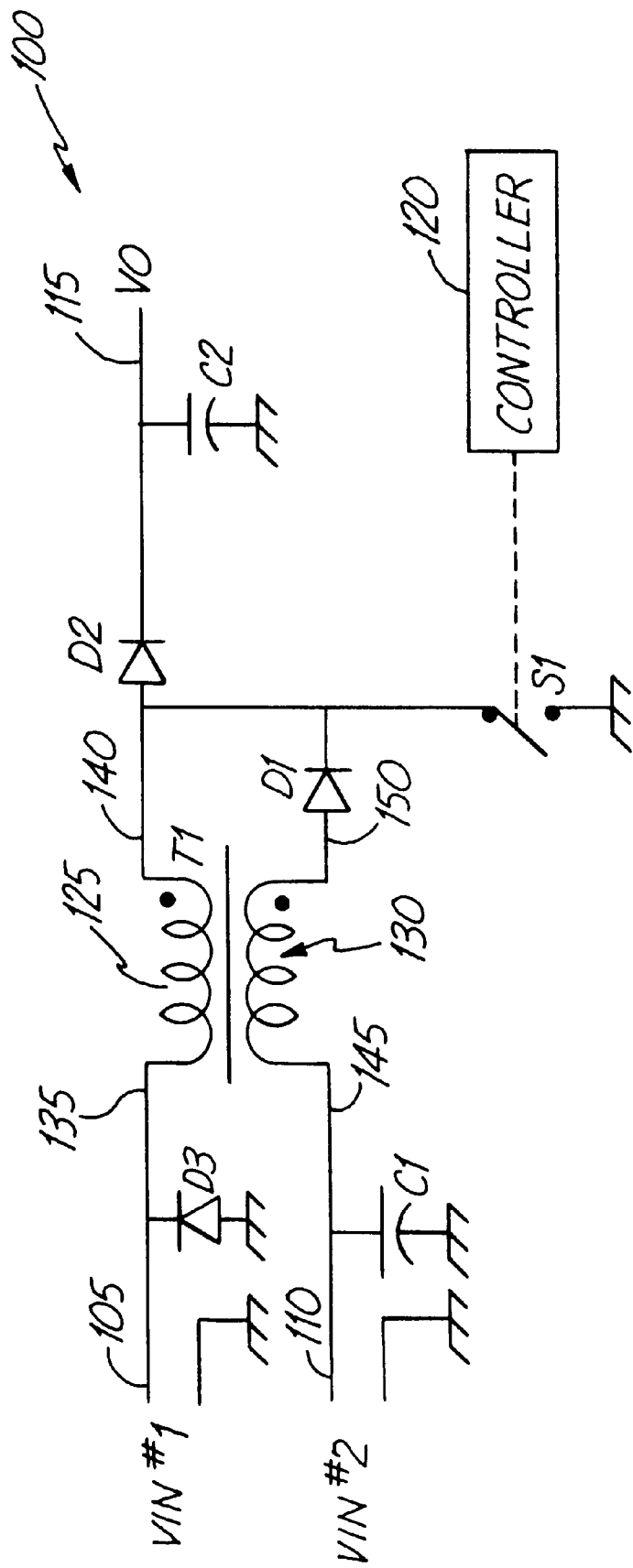
FIG. 1 is a schematic diagram illustrating a first embodiment of a combined boost/flyback power stage circuit in accordance with preferred embodiments of the present invention.

FIG. 1 illustrates combined boost and flyback power conversion circuit 100 in accordance with some embodiments of the present invention. Circuit 100 includes input 105 adapted to receive an AC input signal from an aircraft power source, second input 110 adapted to receive a DC power source input, output 115 at which converted output voltage VO is provided, single transformer T1, diode D1, diode D2, diode D3, capacitor C1, capacitor C2, switch S1 and controller 120. Each of the AC input signal at input 105 and the DC input signal at input 110 are providable relative to a ground connection. The anode of diode D3 is coupled to ground, while the cathode of diode D3 is coupled to input 105. Capacitor C1 is coupled between input 110 and ground.

Transformer T1 has first pin 135, second pin 140, third pin 145, and fourth pin 150. Transformer T1 also has first coil or winding 125 coupled between first pin 135 and second pin 140, as well as second coil or winding 130 coupled between third pin 145 and fourth pin 150. First pin 135 of transformer T1 is coupled to input 105. Second pin 140 of transformer T1 is coupled to the anode of diode D2. Third pin 145 of transformer T1 is coupled to second input 110. Fourth pin 150 of transformer T1 is coupled to the anode of diode D1. The cathode of diode D1 is coupled to the anode of diode D2. The cathode of diode D2 is coupled to output 115 and to ground through capacitor C2. Switch S1 couples the cathode of diode D1, second pin 140 and the anode of diode D2 to ground. Controller 120 is coupled to switch S1 and controls the open and closed states of switch S1 during operation in order to control the "boost" or "flyback" conversions defined above.

In general, while converting power from an AC source, DC source power conversion is disabled and vice versa. Convertor 100 may also be developed such that the AC and DC sources in the combined convertor stage do not share the same common ground, but may be isolated from each other. In either case, it is intended that while one source is present, the other is not. Thus, the combined boost and flyback convertor functions as follows.

For boost conversion of an AC power signal provided at input 105, during the time that switch S1 is closed, a positive voltage from first pin 135 to second pin 140 of transformer T1 is created. Thus, by the polarity of transformer T1, a positive voltage from third pin 145 to fourth pin 150 is induced but no current can flow through coil 130 by virtue of the blocking provided by diode D1. When switch S1 opens, the voltage across pins 135 and 140 of transformer T1 reverses and current is conducted through diode D2 via the transformer winding 125. The reversal of voltage across pins 135 and 140 of transformer T1 also causes the voltage to reverse across pins 145 and 150. However, no current is conducted in the transformer winding 130 as this winding (used as the primary winding for DC "flyback" conversion) has fewer turns than winding 125 and thus a lower voltage by the transformer turns ratio. Therefore, during AC power conversion, the transformer winding 130 is disabled and the combined power stage resembles a boost convertor.

For flyback conversion of a DC power signal provided at input 110, during the time that switch S1 is closed, a positive voltage from third pin 145 to fourth pin 150 of transformer T1 is created. Thus, by the polarity of transformer T1, a positive voltage from first pin 135 to second pin 140 is induced but no current can flow because of the current blocking provided by diodes D2 and D3. When switch S1 opens, the voltage across pins 145 and 150, and pins 135 and 140 of transformer T1 reverse and current is conducted through diode D2 via transformer winding 125. Only leakage inductance current is conducted through diode D1 as the voltage across transformer pins 145 and 150 is now clamped by the transformer turns ratio to Vin+Vflyback. Therefore, during DC power conversion, the combined power stage resembles a flyback convertor.

Figure 2:
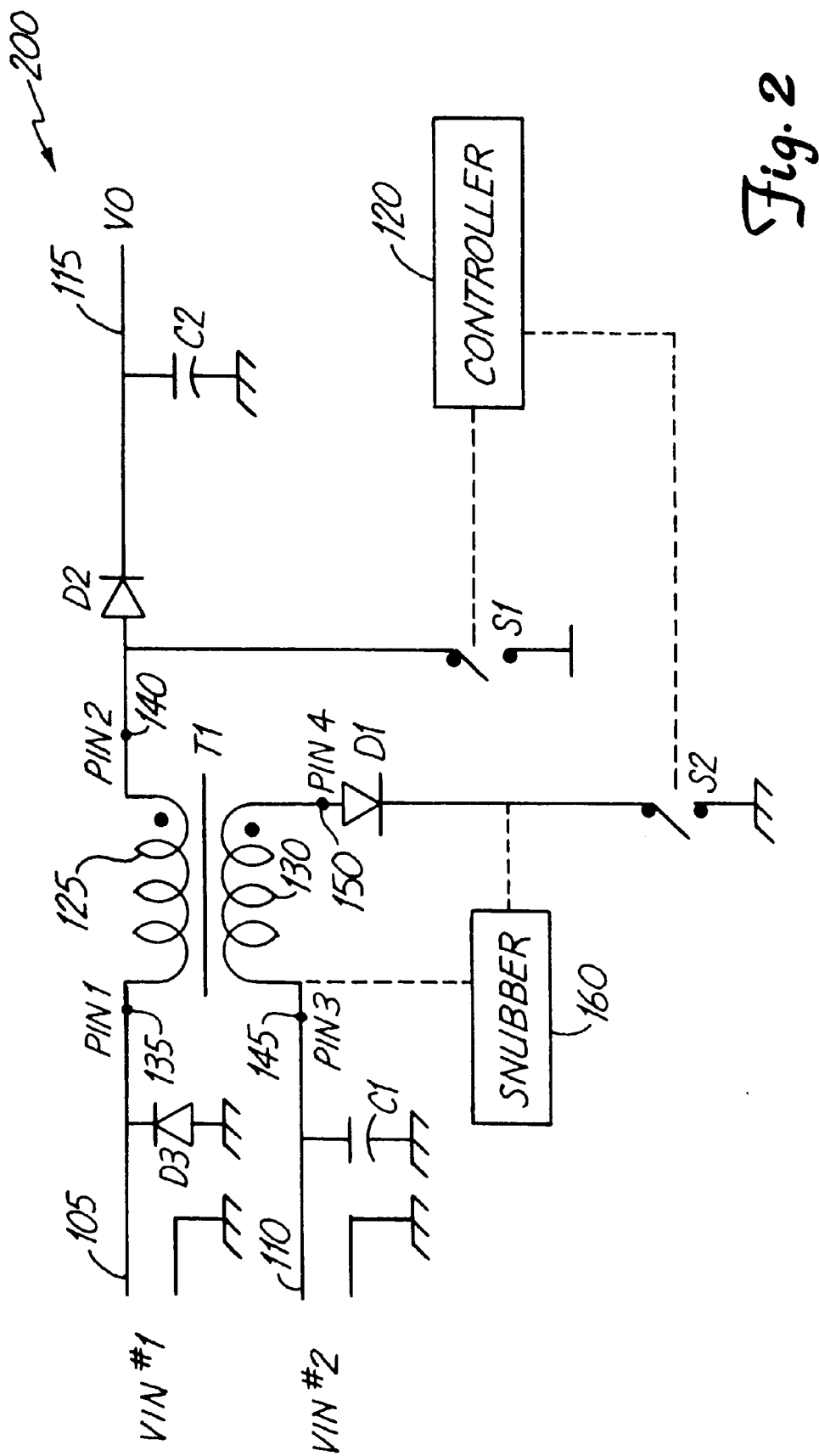
FIG. 2 is a schematic diagram illustrating a second embodiment of a combined boost/flyback power stage circuit in accordance with preferred embodiments of the present invention.

For power conversion that may be considered low power, only a single switch S1 is required to drive both boost and flyback modes of operation. However, as power levels increase such that the losses in switch S1 become too great, a two switch configuration as shown in FIG. 2 may be implemented to relieve the high voltage switching losses on the low voltage DC flyback convertor. Combined boost and flyback power conversion circuit 200 illustrated in FIG. 2 differs from circuit 100 illustrated in FIG. 1 in only a few respects. As can be seen, in circuit 200, the cathode of diode D1 is coupled to ground through second switch S2, instead of through common switch S1. Consequently, controller 120 must control the operation of both of switches S1 and S2. This will allow tailoring of the switches S1 and S2 to reduce overall thermal losses. In some embodiments, since the voltage clamping provided by the configuration of circuit 100 illustrated in FIG. 1 does not exist in the configuration of circuit 200, snubber 160 can be included to clamp or limit the voltage to a desired maximum value. Any of a wide variety of known voltage limiting circuits can be used as snubber 160.

Although the present invention has been described with reference to preferred embodiments, workers skilled in the art will recognize that changes may be made in form and detail without departing from the spirit and scope of the invention.

What is claimed is:

1. An avionics power conversion circuit comprising:
   a first input adapted to receive an AC input signal;
   a second input adapted to receive a DC input signal;
   an output; and
   power conversion means, coupled to each of the first and second inputs and to the output, for providing boost conversion of the AC input signal when the AC input signal is applied to the first input and for providing flyback conversion of the DC input signal when the DC input signal is applied to the second input, wherein the power conversion means provides the boost conversion and the flyback conversion using a single transformer coupled between the first and second inputs and the output, the single transformer including a first winding coupled between first and second pins and a second winding coupled between third and fourth pins, the first pin being coupled to the first input, the second pin being coupled to the output, the third pin being coupled to the second input and the fourth pin being coupled to the second pin.

2. The avionics power conversion circuit of claim 1, wherein the power conversion means further comprises a first diode coupled between the fourth pin and the second pin of the transformer, the first diode having its anode coupled to the fourth pin and having its cathode coupled to the second pin.

3. The avionics power conversion circuit of claim 2, wherein the power conversion means further comprises a second diode coupled between the second pin of the transformer and the output, the second diode having its anode coupled to the second pin and having its cathode coupled to the output.

4. The avionics power conversion circuit of claim 3, wherein the power conversion means further comprises:
   a switch selectively coupling the second pin of the transformer to ground when the switch is in a closed position; and
   a controller coupled to and controlling the switch to selectively couple the second pin of the transformer to ground.

5. The avionics power conversion circuit of claim 4, wherein the power conversion means further comprises:
   a third diode coupling the first input to ground, the third diode having its anode coupled to ground and its cathode coupled to the first input;
   a first capacitor coupling the second input to ground; and
   a second capacitor coupling the output to ground.

6. The avionics power conversion circuit of claim 1, wherein the power conversion means further comprises:
   a first diode having its anode coupled to the fourth pin of the transformer;
   a first switch coupled between the cathode of the first diode and ground; and
   control means coupled to and controlling the first switch to selectively couple the cathode of the first diode to ground.

7. The avionics power conversion circuit of claim 6, wherein the power conversion means further comprises:
   a second diode coupled between the second pin of the transformer and the output, the anode of the second diode being coupled to the second pin and the cathode of the second diode being coupled to the output; and
   a second switch coupled between the second pin of the transformer and ground, wherein the control means is coupled to and controls the second switch to selectively couple the second pin of the transformer to ground.

8. The avionics power conversion circuit of claim 7, wherein the power conversion means further comprises:
   a third diode coupling the first input to ground, the third diode having its anode coupled to ground and its cathode coupled to the first input;
   a first capacitor coupling the second input to ground; and
   a second capacitor coupling the output to ground.

9. An avionics power conversion circuit comprising:
   a first input adapted to receive an AC input signal;
   a second input adapted to receive a DC input signal;
   an output; and
   power conversion circuitry, coupled to each of the first and second inputs and to the output, the power conversion circuitry receiving the AC input signal when the AC input signal is applied to the first input and converting the AC input signal to a DC voltage having a higher magnitude than the AC input signal, the power conversion circuitry receiving the DC input signal when the DC input signal is applied to the second input and converting the DC input signal to a DC voltage having a higher amplitude than the DC input signal, wherein the power conversion circuitry uses a single transformer coupled between the first and second inputs and the output to provide both the conversion of the AC input signal and the conversion of the DC input signal.

10. The avionics power conversion circuit of claim 9, wherein the transformer includes a first winding coupled between first and second pins, the first pin being coupled to the first input and the second pin being coupled to the output.

11. The avionics power conversion circuit of claim 10, wherein the transformer includes a second winding coupled between third and fourth pins, the third pin being coupled to the second input and the fourth pin being coupled to the second pin.

12. The avionics power conversion circuit of claim 11, wherein the power conversion circuitry further comprises a first diode coupled between the fourth pin and the second pin of the transformer, the first diode having its anode coupled to the fourth pin and having its cathode coupled to the second pin.

13. The avionics power conversion circuit of claim 12, wherein the power conversion circuitry further comprises a second diode coupled between the second pin of the transformer and the output, the second diode having its anode coupled to the second pin and having its cathode coupled to the output.

14. The avionics power conversion circuit of claim 13, wherein the power conversion circuitry further comprises:
  a switch selectively coupling the second pin of the transformer to ground when the switch is in a closed position; and
  a controller coupled to and controlling the switch to selectively couple the second pin of the transformer to ground.

15. The avionics power conversion circuit of claim 14, wherein the power conversion circuitry further comprises:
  a third diode coupling the first input to ground, the third diode having its anode coupled to ground and its cathode coupled to the first input;
  a first capacitor coupling the second input to ground; and
  a second capacitor coupling the output to ground.

16. The avionics power conversion circuit of claim 10, wherein the transformer comprises a second winding coupled between third and fourth pins, the third pin being coupled to the second input, wherein the power conversion circuitry further comprises:
  a first diode having its anode coupled to the fourth pin of the transformer;
  a first switch coupled between the cathode of the first diode and ground; and
  a controller coupled to and controlling the first switch to selectively couple the cathode of the first diode to ground.

17. The avionics power conversion circuit of claim 16, wherein the power conversion circuitry further comprises:
  a second diode coupled between the second pin of the transformer and the output, the anode of the second diode being coupled to the second pin and the cathode of the second diode being coupled to the output; and
  a second switch coupled between the second pin of the transformer and ground, wherein the controller is coupled to and controls the second switch to selectively couple the second pin of the transformer to ground.

18. The avionics power conversion circuit of claim 17, wherein the power conversion circuitry further comprises:
  a third diode coupling the first input to ground, the third diode having its anode coupled to ground and its cathode coupled to the first input;
  a first capacitor coupling the second input to ground; and
  a second capacitor coupling the output to ground.

* * * * *